Sept. 4, 1962 M. MARKS 3,052,848

REMOTE CONTROL TELEVISION

Filed May 11, 1959

INVENTOR.
Meyer Marks
BY John L. Wiegreffe
ATTY.

United States Patent Office 3,052,848

Patented Sept. 4, 1962

3,052,848

REMOTE CONTROL TELEVISION

Meyer Marks, Clarendon Hills, Ill., assignor to Admiral Corporation, Chicago, Ill., a corporation of Delaware Filed May 11, 1959, Ser. No. 812,441
2 Claims. (Cl. 325—392)

This invention relates to remotely controlled television receivers in which the control unit is continuously energized.

A remote control unit for a television receiver or like device is a decided convenience for the operator. Not only does such a system obviate his leaving the viewing position to perform various tuning functions on the receiver, but it also makes possible better tuning since tuning functions are performed in the exact position from which the receiver is viewed.

The number of tuning functions which may be performed remotely is, in general, limited by considerations such as the compactness of the transmitter, the complexity of the control unit and the cost of the system to the consumer. This invention is directed towards exacting more control functions out of a given transmitter-control unit combination.

Accordingly the object of this invention is to provide an improved ultrasonic remote control system which efficiently utilizes the control channels.

This invention will best be understood by reading the specification in conjunction with the drawings in which.

It should be noted at the outset that the specific enumeration of certain control functions in the specification should not be taken to exclude incorporation of other control functions. Also the disclosure of the invention in conjunction with a two channel control unit should not be construed to limit the application of the invention as obviously a greater or lesser number of channels may be provided. In this connection the term channel is used to describe the number of outputs, e.g., outputs A and B of FIGS. 1 and 2 on the control unit.

Figure 1:
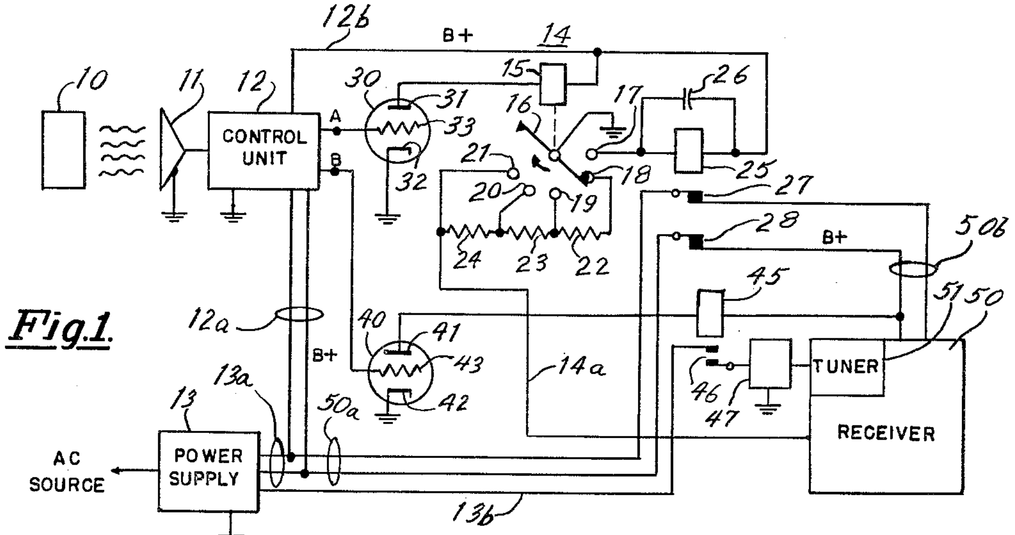
FIG. 1 is a simplified diagram of a remote control system utilizing one form of the invention.

Referring now to FIG. 1, there is shown a receiver 50 in block form which is arranged to have certain of its tuning functions controlled by control unit 12, also shown in block form. A common power supply 13 for supplying operating potentials to control unit 12 and receiver 50 is provided. Power supply 13 also is arranged to provide power for block 47 which should be understood to include a motor, and necessary control circuitry, for driving tuner 51 of receiver 50.

Transmitter 10 includes means (not shown) for generating a number of ultrasonic signals lying within a predetermined frequency band. For purposes of this application it will be assumed that transmitter 10 is arranged to transmit two ultrasonic frequency signals each having a different frequency lying within said band. Microphone 11 receives the transmitted signals from transmitter 10 and couples them to control unit 12. Control unit 12 should be understood to contain circuitry for amplifying the signals coupled to it by microphone 11 and for separating these signals on the basis of their frequency. That is, in response to one of the control signals of transmitter 10, output A, for example, of control unit 12 will be driven in a positive voltage direction, whereas, in response to the other of the control signals of transmitter 10, output B will be driven in a positive voltage direction. Outputs A and B are, under normal conditions, held at a negative potential. Circuitry for accomplishing the above is fully described in a co-pending application of the inventor, Serial No. 799,901, filed March 17, 1959.

Grounded power supply 13 is, as is indicated by the arrow, connected to an A.C. source (not shown). Power supply 13 should be understood to include means (not shown) for developing necessary D.C. and A.C. operating potentials for control unit 12 and receiver 50. These operating potentials appear on leads 13A of power supply 13. Control unit 12 and power supply 13 are coupled together via leads **13*a* and 12*a* and receiver 50 and power supply 13 are coupled together via leads 13*a* and the series combination of leads 50*b*, contacts 27 and 28 and leads 50*a*. Additionally, motor operating voltage is supplied over lead 13*b* for the motor (not shown) contained in block 47**.

Output A of control unit 12 is connected to grid 33 of tube 30. Tube 30 also includes a grounded cathode 32 and a plate 31 which is connected, through the winding of an electromagnet 15 of a rotary stepping switch 14, to B+ potential bearing lead **12*b*. Rotary stepping switch 14 is of a type well known in the art. It has a double ended wiper 16 which is driven, under control of electromagnet 15, into successive contact with bank contacts 17 to 21. For the sake of clarity, and since rotary switch 14 is a familiar device in the art, the various mechanical linkages and structure necessary to produce sequential stepping of switch wiper 16 responsive to operations and restorations of electromagnet 15 are not shown. For present purposes it need only be remembered that for every complete cycle of operation of electromagnet 15, that is, for every energization and deenergization thereof, switch wiper 16** will be stepped to the next succeeding bank contact.

A double ended wiper is used to provide continuous bank stepping without the necessity of having an undue number of bank contacts. Thus, when wiper 16 is resting on contact 21, the next cycle of operation of electromagnet 15 will bring the other end of wiper 16 into contact with bank contact 17. Thus, while bank contacts 17 to 21 lie within an included angle of less than 180°, the provision of a double ended switch wiper permits continuous bank stepping.

Resistors 22, 23 and 24 are bridged across contacts 18 and 19, 19 and 20, and 20 and 21, respectively. Additionally, contact 21 is connected by a lead **14*a* to receiver 50. Again for purposes of illustration it will be assumed that lead 14*a* enters a volume control network (not shown) in receiver 50. It will be noted that double ended switch wiper 16 is grounded in the center and that when it is resting on bank contact 18 the series combination of resistors 22, 23 and 24 is inserted in lead 14*a*. When wiper 16 is resting on bank contact 19 the series combination of resistors 23 and 24 is inserted in lead 14*a*. Similarly the resistance in lead 14*a* is decreased when wiper 16 is resting on contact 20, until in the last position, on contact 21, a ground is placed on lead 14*a***.

Bank contact 17 is connected to a relay 25, the other end of which is connected to a B+ bearing lead **12*b*. Thus, when wiper 16 rests on bank contact 17, the ground to wiper 16 completes an energizing circuit for relay 25 which then opens its contacts 27 and 28. The opening of contacts 27 and contacts 28 removes the connection between leads 50*a* and 50*b*, interrupting the flow of power from power supply 13 to receiver 50**.

Similarly output B is connected to grid 43 of tube 40. Tube 40 also contains a grounded cathode 42 and a plate 41 which is connected through a relay 45 to the B+ bearing one of leads **50*b*. Relay 45 has a pair of normally open contacts 46 which when closed connect lead 13*b* to block 47 completing a circuit for the motor (not shown) in block 47**.

It will now be assumed that switch wiper 16 is resting on bank contact 18 and that the operator or viewer wishes to remotely adjust the volume level of receiver 50. Transmitter 10 may be of the hand held type well known in the art which has a number of buttons (not shown) each corresponding to a particular control function. Since control unit 12 has two control channels, transmitter 10 is provided with two buttons. These buttons are labelled Station Selection and Volume, respectively. However, as will be seen shortly, due to the application of the invention the button labelled Volume may in addition be labelled On-Off. By pressing the station selection button, a relatively short ultrasonic signal of one frequency is generated by transmitter 10, and by pressing the volume button an ultrasonic signal of another frequency is generated. Thus, if the viewer wishes to change the volume level of receiver 50 he need merely actuate the button marked Volume on transmitter 10. The signal thus generated is received by microphone 11 and coupled to control unit 12. It is amplified and dependent upon the frequency of the signal, one or the other of outputs A and B of control unit 12 will be driven positive.

As indicated in FIG. 1, responsive to the frequency of the ultrasonic signal generated when the button marked Volume is actuated, output A of control unit 12 is driven positive. As output A swings positive, grid 33 is driven positive and allows more current to flow between anode 31 and cathode 32. As the anode to cathode current increases, electromagnet 15 of rotary stepping switch 14 is energized sufficiently to prepare the mechanical portion (not shown) of the switch for stepping of wiper 16. After the control signal from transmitter 10 subsides, output A is driven negatively and the anode to cathode current in tube 30 diminishes sufficiently to deenergize the winding of electromagnet 15. Upon deenergization of electromagnet 15, the mechanical portion (not shown) of rotary stepping switch 14 causes wiper 16 to step from bank contact 18 to bank contact 19, thus changing the series resistance in lead 14*a*, and hence the volume level of receiver 50.

In a similar manner successive actuations of the volume button (not shown) on transmitter 10 result in switch wiper 16 being stepped to bank contact 20, bank contact 21, etc. When switch wiper 16 is resting on bank contact 21 the next actuation of the volume button will step switch wiper 16 into engagement with bank contact 17 and an energizing path for relay 25 will be completed. Relay 25, upon energization, opens contacts 27 and contacts 28 which interrupts power flow from power supply 13 to receiver 50 and receiver 50 is turned "off."

It will be noted that rotary stepping switch 14, as shown in FIG. 1, is a unidirectional device, that is, switch wiper 16 is always stepped in the same direction. Therefore, the volume level of receiver 50 is variable in a single direction. For instance, when wiper 16 rests on bank contact 18, a minimum volume position is attained, whereas when wiper 16 is on bank contact 21 a maximum volume position is attained. Likewise bank contacts 19 and 20 represent in ascending order positions intermediate the low and high volume positions. Bank contact 17 of course represents a "no volume" position since receiver 50 is turned "off" when switch wiper 16 engages bank contact 17. Thus it is seen that when the viewer wishes to change the volume of receiver 50 from the maximum volume position, as represented by switch wiper 16 engaging contact 21, to a position of lower volume, switch wiper 16 must be driven through the "off" position as represented by bank contact 17. While this condition may not be objectionable to the viewer (another actuation of the volume button on transmitter 10 will quickly step wiper 16 off bank contact 17 into engagement with contact 18) it may be objectionable from the standpoint of the components and circuits of receiver 50. To obviate undesired switching of receiver 50, a delaying capacitor 26 is placed in parallel with relay 25. In practice, using moderate size capacitors, an operating delay of five seconds for relay 25 may be achieved. This time delay prevents needless switching of receiver 50 when making volume adjustments which necessitate wiper 16 engaging bank contact 17. It will of course be obvious that other means of obtaining a time delay may be incorporated with equal facility.

It will be apparent upon analysis of the circuit of FIG. 1 that when receiver 50 is in the "off" position, that is, when relay 25 is energized and contacts 27 and contacts 28 are open, operation of the station selection button (not shown) on transmitter 10 will have no effect. This follows since tube 40 receives its plate supply voltage from power supply 13 through contacts 28 which are open when receiver 50 is deenergized. When switch wiper 16 of rotary stepping switch 14 is in engagement with any bank contact except bank contact 17 relay 25 is deenergized and contacts 27 and 28 are closed. Thus power is supplied to receiver 50 and, via relay 45, to tube 40.

Assume that receiver 50 is in the "on" position. If the viewer wishes to remotely change the station tuning, he merely depresses the button marked Station Selection on transmitter 10. Responsive to the actuation of this button, transmitter 10 generates a short ultrasonic signal which has a different frequency from the previous signal generated when the volume button was actuated. This signal is picked up by microphone 11 and coupled to control unit 12, where it is amplified. Responsive to this signal frequency, output B of control unit 12 is driven positive and current flow between plate 41 and cathode 42 of tube 40 is increased sufficiently to energize relay 45. Relay 45 upon energization closes contacts 46 thus connecting lead 13*b* from power supply 13 to block 47, which, as mentioned previously, includes a motor and the control circuitry therefor. This circuitry (not shown) in block 47 is effective to control the driving of tuner 51 by the motor (not shown), to a succeeding preselected tuning point. Again, after the control signal from transmitter 10 has subsided output B swings negatively and conduction between plate 41 and cathode 42 of tube 40 is reduced sufficiently to deenergize relay 45.

It is to be noted that power supply 13 is designed for continuous operation and therefore control unit 12 will be continuously energized. To that end, low power consumption components, such as transistors, are desirable in this arrangement. It will also be apparent that, since vacuum tubes 30 and 40 are used in the embodiment shown and, since in the standby position it is desirable to limit the amount of power consumed, it is contemplated that the filament power for tube 40 be supplied from receiver 50 although such a connection is not shown in the diagram. The filament of tube 30 (not shown) would of necessity be supplied from control unit 12 since tube 30 must be in an energized condition on standby.

Volume control in two directions and/or station selection in two directions may be provided for in the circuitry of FIG. 1. However, this could not be done without materially increasing the complexity of control unit 12 and transmitter 10 and, of course, the overall cost of the system to the consumer. In its preferred form receiver 50 is a television receiver and it will be readily observable that with the circuit of FIG. 1 the viewer may remotely control the most important tuning functions of the television receiver, namely, receiver volume, receiver station tuning and receiver "on-off." All of this may be accomplished without requiring the viewer to leave his viewing position.

Figure 2:
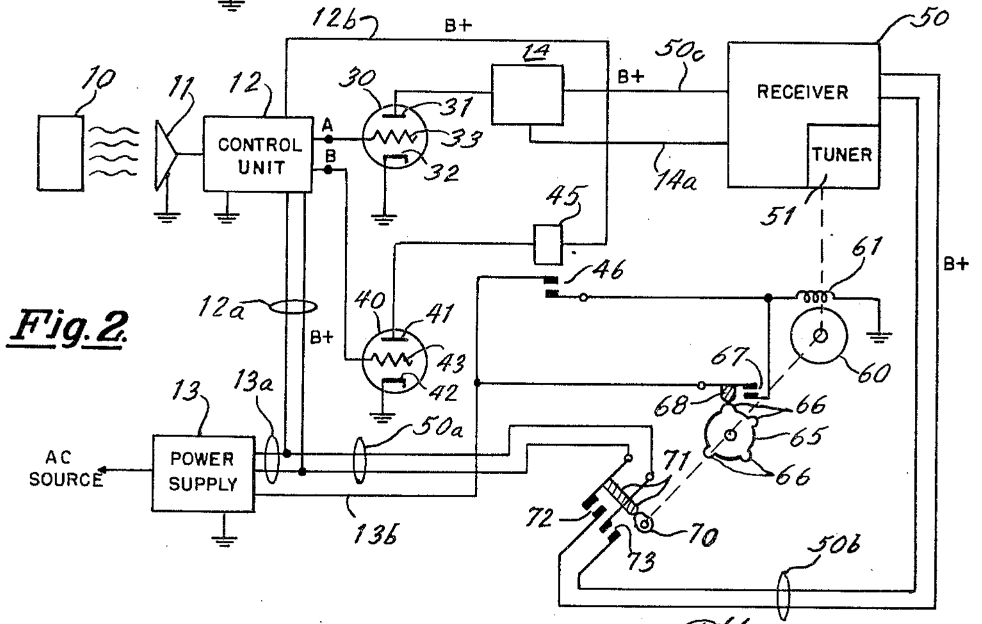
FIG. 2 is a simplified diagram of a remote control system utilizing another form of the invention.

In FIG. 2 a circuit incorporating similar elements as those in FIG. 1 is shown. These similar elements bear the same reference characters as their counterparts in FIG. 1. In FIG. 2 there is shown a transmitter 10, and a microphone 11 which is coupled to a control unit 12 having two outputs, A and B. Grounded common power supply 13 supplies operating potentials to control unit 12 over leads 13*a* and leads 12*a* and to receiver 50 over leads 13*a*, leads 50*a*, contacts 72 and 73 and leads 50*b*. Output A is connected to grid 33 of tube 30 which, as in FIG. 1, has a grounded cathode 32 and a plate 31 connected through block 14 to a B+ bearing lead 50*c* from receiver 50. Block 14 in FIG. 2 includes a rotary stepping switch and the associated circuitry for varying the resistance in lead 14*a*, which connects to a volume control network (not shown) in receiver 50. It is to be particularly noted at this point that block 14 does not include a relay similar to relay 25 since, as will be obvious from the description following, such a relay is not necessary in this embodiment.

A motor 60 having a grounded winding 61 is mechanically coupled to tuner 51, program wheel 65, and to a disconnect cam 70 as is indicated by the dashed lines joining these components. Program wheel 65 has a series of cam lobes 66 on the periphery thereof. A cam follower 68 is arranged to ride on the periphery of program wheel 65 and, as a result of the action of the cam lobes in raising cam follower 68, contacts 67 are opened. In practice cam lobes 66 on program wheel 65 are so positioned along the periphery thereof that when tuner 51 reaches desired station tuning points contacts 67 will be opened.

Another pair of cam followers 71 ride against disconnect cam 70 and are arranged to open contacts 72 and contacts 73 at or very near the high point of cam 70. Operating potential for motor 60 is supplied from power supply 13 over lead 13*b* to the fixed member of contacts 46 and to the movable member of contacts 67.

Upon actuation of the station selection button (not shown) on transmitter 10, an ultrasonic signal of a particular frequency is generated by transmitter 10 and received by microphone 11. Thereafter it is coupled to control unit 12 and is effective to drive output B positive in the same manner described in FIG. 1. Grid 43 of tube 40 is thus driven positive and the anode to cathode current flow is increased sufficiently to energize relay 45. Relay 45 closes contacts 46 and connects the motor operating voltage from power supply 13, via lead 13*b*, to grounded motor winding 61. Winding 61 is energized and motor 60 begins to rotate. As motor 60 rotates, program wheel 65 rotates and cam follower 68 rides off of the cam 66 on which it is resting, thus closing contacts 67. The closing of contacts 67 provides a parallel energizing path for motor winding 61. When the control signal subsides output B again swings negative and conduction in tube 40 is reduced to the point where relay 45 is deenergized. Relay 45 upon deenergization opens contacts 46, but motor 60 continues to rotate due to the parallel energizing path for motor winding 61 existing through contacts 67. Motor 60 continues to rotate until the next preset cam lobe 66 raises cam follower 68, opening contacts 67.

In practice, assuming that receiver 50 is a television receiver, cam lobes 66 would be dispersed on the periphery of program wheel 65 to stop tuner 51 at selected points for tuning in local television transmitting stations. Disconnect cam 70 may be set or arranged to open contacts 72 and contacts 73 at any desired position of program wheel 65. It may be advantageous to set disconnect cam 70 to open these contacts when program wheel 65 is in a position corresponding to an unused station tuning point of tuner 51. It will of course be apparent that a cam lobe 66 on program wheel 65 must be set to open contact 67 at the same time that disconnect cam 70 opens its contacts. Otherwise, motor 60 would rotate past the operating point of cam 70 and cam 70 would be ineffective.

Regardless of the arrangement used, it is obvious that disconnect cam 70 will make one complete revolution for each complete revolution of program wheel 65. Therefore, at some preselected point, the actuation of the station select button (not shown) on transmitter 10 will result in disconnect cam 70 opening contacts 72 and 73 and hence interrupting power flow from power supply 13 to receiver 50. Here again as in FIG. 1, since the power to control unit 12 and to tube 40 and relay 45 is always available, a subsequent actuation of the station select button on transmitter 10 will simultaneously cause motor 60 to drive tuner 51 to the next preset station tuning point and connect power supply 13 to receiver 50 to turn receiver 50 "on."

Figure 3:
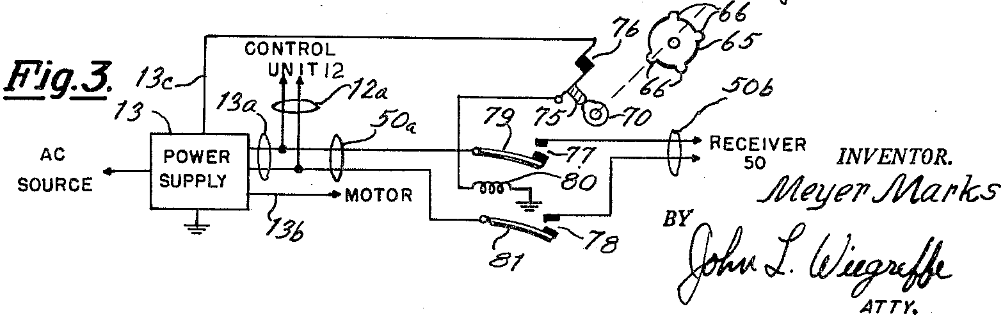
FIG. 3 is a modification of a portion of FIG. 2.

In FIG. 3 a modification of the circuit of FIG. 2 is shown. In this circuit two pairs of contacts 77 and 78 are mounted on a pair of bimetallic strips 79 and 81, respectively, which are serially connected between leads 50*a* and 50*b*, interconnecting power supply 13 and receiver 50. Disconnect cam 70 operates contacts 76 to close a circuit from power supply 13 to a heating coil 80. Heating coil 80 is placed close to the bimetallic strips which bend in a well known manner when subjected to heat. As these bimetallic strips bend, contacts 77 and contacts 78 are opened and the power from power supply 13 to receiver 50 is interrupted. This arrangement is incorporated to provide a time delay so that receiver 50 will not be switched "off" every time disconnect cam 70 operates contacts 76.

It will be understood that the invention is not to be limited by the particular arrangements used and that various modifications may be resorted to without departing from the true spirit and scope of the invention as defined in the following claims.

What is claimed is:

1. In a television receiver; a control unit actuatable in response to remotely transmitted ultrasonic control signals of particular frequency and predetermined minimum duty cycle for controlling, in a step-wise manner, at least one operating function of said receiver; means for transmitting said control signals; a common source of electrical power for said receiver and said control unit; switching apparatus connected to and operable responsive to actuation of said control unit, said switching apparatus having a plurality of switching positions; electric circuits associated with each said switching position for varying said operating function of said receiver in accordance with the switching position occupied by said switching apparatus; deenergizing means effective when said switching apparatus is in a particular one of said switching positions for disconnecting said electrical power from said receiver only; and time delay means for delaying operation of said deenergizing means for a predetermined time after said switching apparatus is in said particular one of said switching positions.

2. In a television receiver as set forth in claim 1 wherein said time delay means comprises a thermal responsive device and means applying heat to said device only when said switching apparatus is in said particular one of said switching positions.

References Cited in the file of this patent

UNITED STATES PATENTS

| | | |
|---|---|---|
| 1,930,029 | Alden | Oct. 10, 1933 |
| 2,188,498 | Curtis et al. | Jan. 30, 1940 |
| 2,216,671 | McDonald | Oct. 1, 1940 |
| 2,383,338 | Newman | Aug. 21, 1945 |
| 2,817,025 | Adler | Dec. 17, 1957 |
| 2,897,354 | Bourget | July 28, 1959 |

OTHER REFERENCES

"Mystery Control," Radio and Television, Jan. 1939, pages 523 and 564.